US012783092B2

(12) United States Patent
Horie et al.

(10) Patent No.: US 12,783,092 B2
(45) Date of Patent: Nov. 3, 2026

(54) INPUT OPERATION DEVICE

(71) Applicant: ALPS ALPINE CO., LTD., Tokyo (JP)

(72) Inventors: Kazuma Horie, Miyagi (JP); Yoshihiro Hashimoto, Unterschleissheim (DE); Hiromi Motoi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 170 days.

(21) Appl. No.: 18/779,548

(22) Filed: Jul. 22, 2024

(65) Prior Publication Data

US 2024/0377911 A1 Nov. 14, 2024

Related U.S. Application Data

(63) Continuation of application No. PCT/JP2022/046599, filed on Dec. 19, 2022.

(30) Foreign Application Priority Data

Mar. 14, 2022 (JP) ................................. 2022-039279

(51) Int. Cl.
*G06F 3/044* (2006.01)
*G01V 3/08* (2006.01)
(Continued)

(52) U.S. Cl.
CPC .............. *G06F 3/044* (2013.01); *G01V 3/088* (2013.01); *G05G 1/015* (2013.01); *G05G 1/02* (2013.01);
(Continued)

(58) Field of Classification Search
CPC .. G05G 1/02; G05G 1/015; G06F 3/02; G06F 3/041; G06F 2203/04108; G01V 3/088
See application file for complete search history.

(56) References Cited

U.S. PATENT DOCUMENTS

2002/0112942 A1* 8/2002 Galmiche ............ H03K 17/962 200/600
2013/0161179 A1 6/2013 Tamura et al.

FOREIGN PATENT DOCUMENTS

JP 2000-149703 5/2000
JP 2012-048407 3/2012
(Continued)

OTHER PUBLICATIONS

International Search Report for PCT/JP2022/046599 mailed on Feb. 28, 2023.

*Primary Examiner* — Tung X Nguyen
(74) *Attorney, Agent, or Firm* — IPUSA, PLLC

(57) ABSTRACT

An input operation device includes: an operation member to be pushed by an operator at a plurality of press positions of the operation member; a push switch to be in an on state from an off state by pushing; a panel that includes an operation surface that is to be touched by the operator and on which a plurality of symbols are arranged; an electrostatic detection sensor that includes a plurality of electrostatic electrodes provided on a surface of the panel opposite to the operation surface of the panel in an area on the panel in which the symbols are arranged in a plan view, the electrostatic detection sensor to detect an electrostatic capacitance upon approach of a finger of the operator for each of the electrostatic electrodes; and a determiner to determine which of the operation member and the symbols has been operated by the operator.

7 Claims, 9 Drawing Sheets

(51) Int. Cl.

| | |
|---|---|
| ***G05G 1/015*** | (2008.04) |
| ***G05G 1/02*** | (2006.01) |
| ***G06F 3/02*** | (2006.01) |
| ***H01H 13/12*** | (2006.01) |

(52) U.S. Cl.
CPC ............... *G06F 3/02* (2013.01); *H01H 13/12* (2013.01); *G06F 2203/04108* (2013.01)

(56) References Cited

FOREIGN PATENT DOCUMENTS

| | | | |
|---|---|---|---|
| JP | 2013-016437 | 1/2013 | |
| JP | 2013-134635 | 7/2013 | |
| JP | 5831902 B2 * | 12/2015 | ........... H03K 17/962 |

* cited by examiner

INPUT OPERATION DEVICE

CROSS-REFERENCE TO RELATED APPLICATIONS

This application is a continuation application of International Application No. PCT/JP2022/046599, filed on Dec. 19, 2022, and designated the U.S., which is based upon and claims priority to Japanese Patent Application No. 2022-039279, filed on Mar. 14, 2022, the entire contents of which are incorporated herein by reference.

BACKGROUND

1. Field of the Invention

The present disclosure relates to an input operation device.

2. Description of the Related Art

Conventionally, there has been provided a multi-pole push-button switch (input operation device) which includes: two self-recovery type individual push-button switches having the same operation stroke and the same operation force, which are arranged on a base at a predetermined interval; and an operation button which is arranged so as to cover the upper part of the two individual push-button switches as to be movable up and down, and which includes a press part for each of the two individual push-button switches on the lower surface of the operation button. The individual push-button switches can be individually turned on by pressing a predetermined area near the individual push-button switches on the upper surface of the operation button. The two individual push-button switches can also be turned on simultaneously by pressing a predetermined range on the upper surface of the intermediate part of the two individual push-button switches (for example, see Japanese Laid-Open Patent Application No. 2000-149703).

SUMMARY

An input operation device according to one embodiment of the present disclosure includes: an operation member configured to be pushed by an operator at a plurality of press positions of the operation member; a push switch configured to be in an on state from an off state by pushing; a panel that includes an operation surface that is configured to be touched by the operator and on which a plurality of symbols are arranged; an electrostatic detection sensor that includes a plurality of electrostatic electrodes provided on a surface of the panel opposite to the operation surface of the panel, in an area on the panel in which the symbols are arranged in a plan view, the electrostatic detection sensor being configured to detect an electrostatic capacitance upon approach of a finger of the operator for each of the electrostatic electrodes; and a determiner configured to determine which of the operation member and the symbols has been operated by the operator in accordance with the on or off state of the push switch and a detection result of the finger by the electrostatic detection sensor.

DETAILED DESCRIPTION OF THE DISCLOSURE

In an existing input operation device, all operations are distinguished by a mechanical configuration formed of two individual push-button switches and an operation button including a press part for each of the two individual push-button switches on the lower surface of the operation button. Accordingly, the size of the input operation device is large.

It is therefore an object of the present invention to provide a compact input operation device capable of distinguishing among a plurality of operations.

An embodiment to which an input operation device of the present disclosure is applied will be described below.

Embodiment

<Configuration of Input Operation Device 100>

Figure 1A:
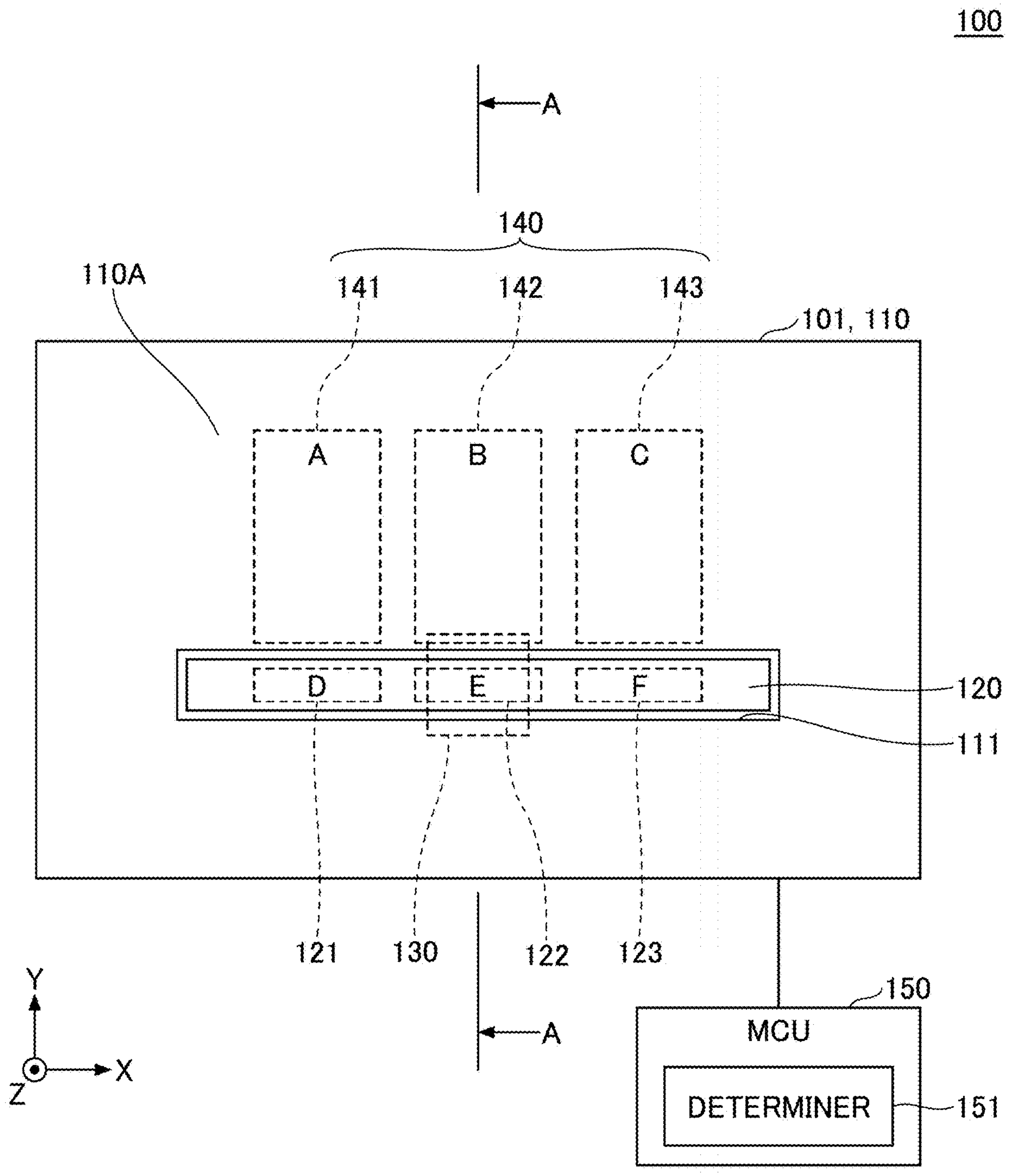
FIG. 1A is a diagram illustrating an example of a configuration of an input operation device 100 of one embodiment.
Figure 1B:
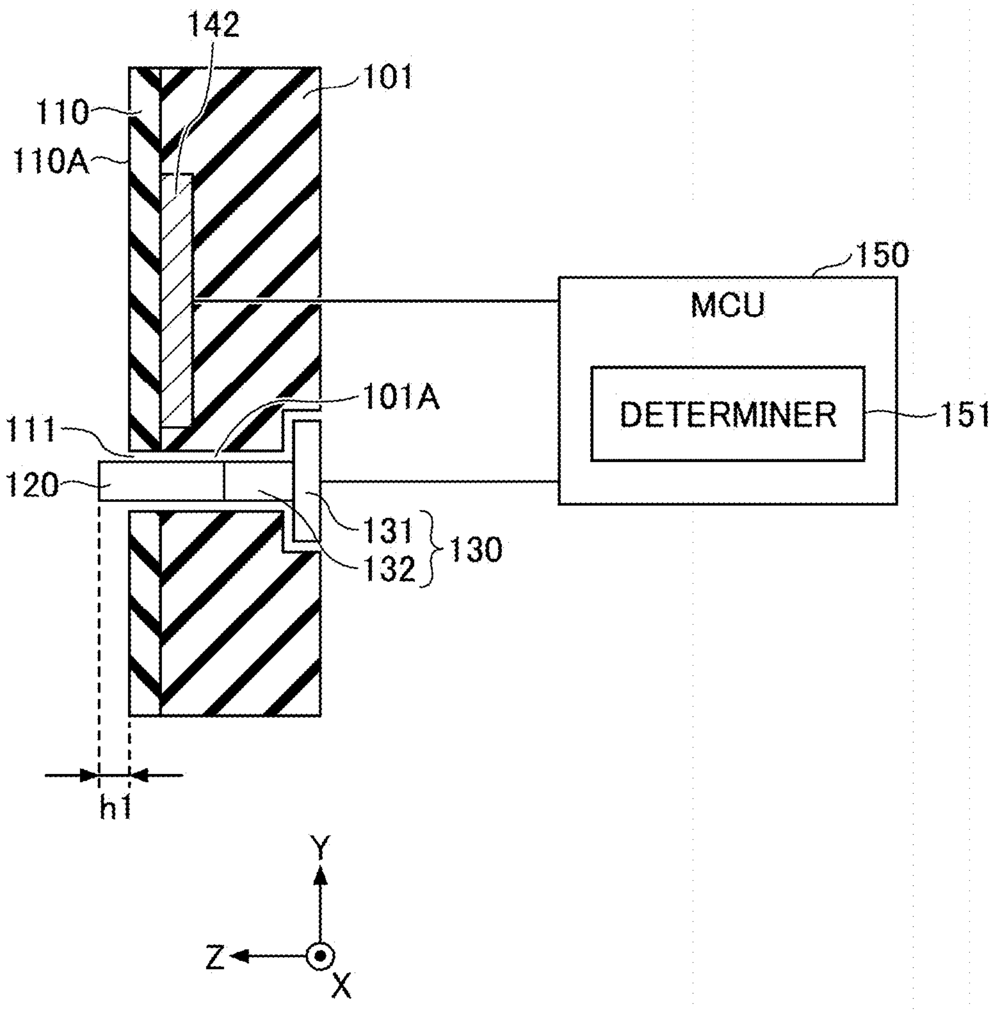
FIG. 1B is a diagram illustrating an example of the configuration of the input operation device 100 of the embodiment.
Figure 1C:
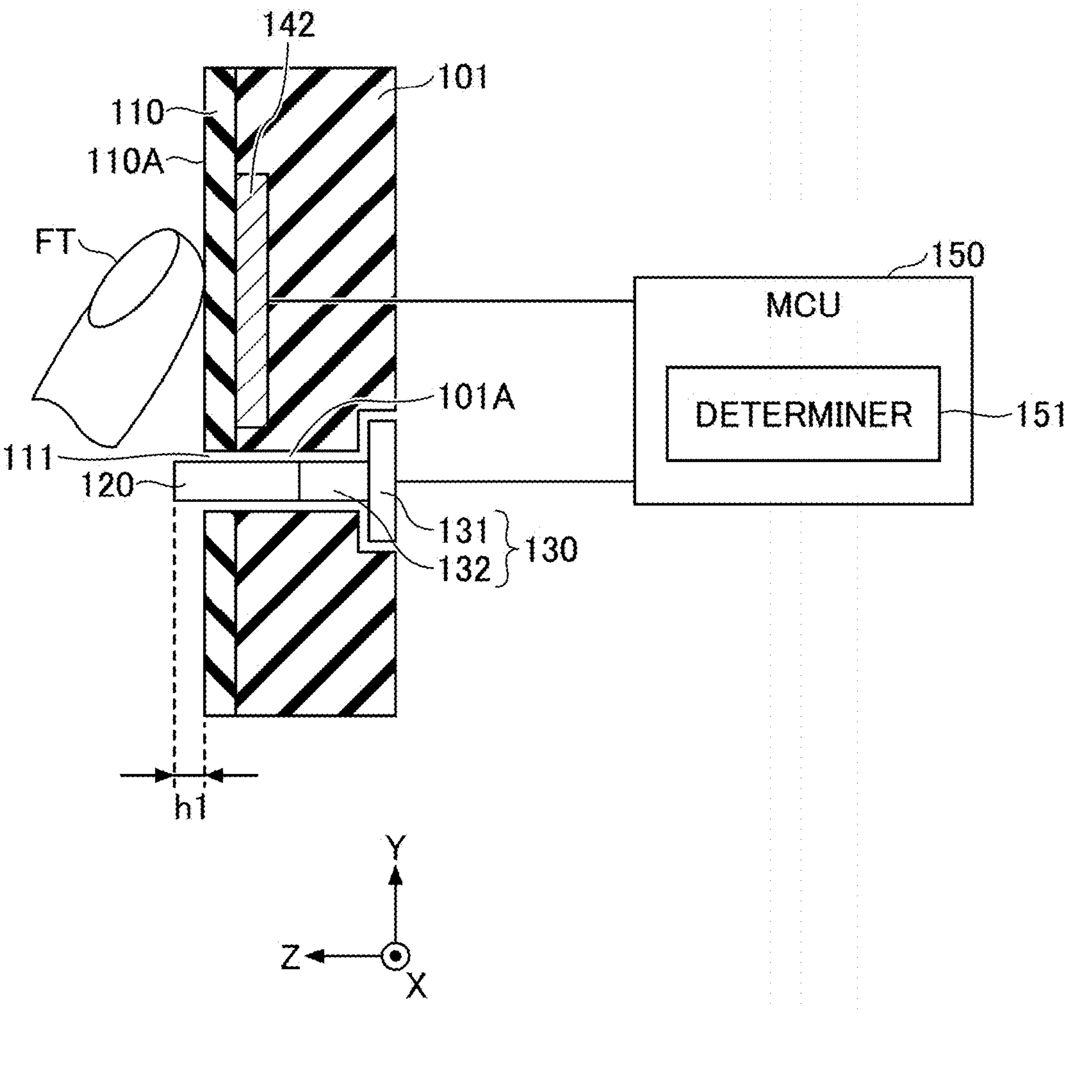
FIG. 1C is a diagram illustrating an example of the configuration of the input operation device 100 of the embodiment.
Figure 1D:
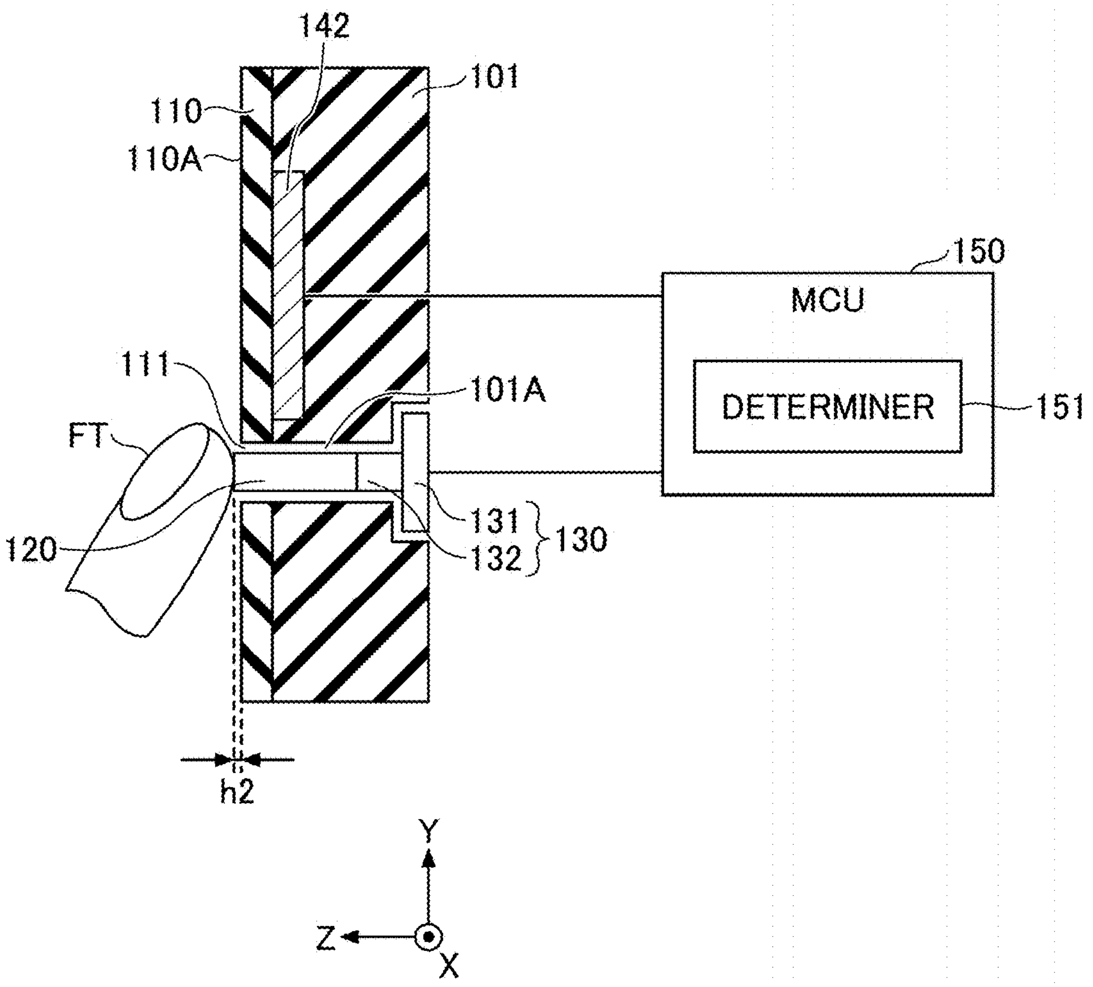
FIG. 1D is a diagram illustrating an example of the configuration of the input operation device 100 of the embodiment.

FIGS. 1A to 1D illustrate examples of a configuration of an input operation device 100 of one embodiment. FIGS. 1B to 1D illustrate cross sections taken along line A-A in FIG. 1A.

Hereinafter, an XYZ coordinate system will be defined and explained. For convenience of explanation, a side toward the −Z direction will be referred to as a lower side or lower, and a side toward the +Z direction will be referred to as an upper side or upper. Moreover, viewing in an XY plane will be referred to as a plan view.

The input operation device 100 includes a case 101, a panel 110, an operation member 120, a push switch 130, an electrostatic detection sensor 140, and a micro controller unit (MCU) 150. The input operation device 100 is a device that is assumed to be operated by an operator with a finger. Although the input operation device 100 can be operated with a part of a hand other than fingers, a case in which the operator operates with a fingertip FT (see FIGS. 1C and 1D) will be described as an example.

The input operation device 100 may be, for example, an operation part that is provided in a vehicle and operates devices mounted on the vehicle. The input operation device 100 may also be an operation part provided in a tablet computer, a smartphone, a game machine, or the like. The input operation device 100 may be, for example, an operation part of an input device or the like that is provided in a store, a facility, or the like and used by many unspecified users.

The case 101 is provided on a lower side of the input operation device 100 and is a housing made of resin or the like for holding the operation member 120, the push switch 130, and the electrostatic detection sensor 140. The panel 110 is fixed to an upper surface of the case 101 by adhesion or the like. The case 101 has a hole 101A for accommodating the operation member 120 and the push switch 130. Although an MCU 150 is illustrated outside the case 101 in FIGS. 1A to 1D, the case 101 may hold or accommodate the MCU 150.

Since the panel 110 is fixed to the upper surface of the case 101, it is positioned on an upper surface side of the input operation device 100. A portion of the upper surface of the panel 110 that overlaps with electrostatic electrodes 141 to 143 of the electrostatic detection sensor 140 at least in a plan view and a periphery of the portion of the upper surface of the panel 110 are an operation surface 110A. The operation surface 110A is an area of the upper surface of the panel 110 where at least the electrostatic electrodes 141 to 143 can detect an electrostatic capacitance between the fingertip FT and each electrostatic electrode.

As illustrated in FIG. 1A, symbols A, B, and C are provided at a part in the +Y direction of the portion of the panel 110 that overlaps with the electrostatic electrodes 141 to 143. The operator can touch on the area of the operation surface 110A where the symbols A, B, and C are provided. Touching is an operation in which the operation surface 110A is touched with a fingertip FT in order to select one of the symbols A, B, or C. The symbols A, B, and C will be described in the following.

The panel 110 has an opening 111 on a side of the −Y direction relative to a part overlapping with the electrostatic electrodes 141 to 143 in a plan view. The opening 111 is, for example, a rectangular opening that is long in the X direction and accommodates the operation member 120.

The symbols A, B, and C are visible from the upper surface of the panel 110 as illustrated in FIG. 1A. The symbols A, B, and C are arranged in a row at equal intervals in the X direction, and their positions in the Y direction are the same. The symbols A, B, and C are, for example, characters or signs representing the types of devices operable by the input operation device 100, the contents of operation, and the like. For example, when a device operable by the input operation device 100 is an audio, the symbol representing the type of the device is a character or a sign representing the audio, and a symbol representing the contents of operation is a character or a symbol for adjusting the volume.

Although symbols A, B, and C are illustrated here, various symbols can be displayed instead of the letters A, B, and C. The symbols A, B, and C may be formed on the panel 110 by printing, embossing, or the like. Also, the symbols A, B, and C may be formed by having translucent portions and light-shielding portions adapted to the shapes of the letters and signs of the symbols, and may illuminate the letters and signs of the symbols by projecting light emitted from a light source arranged on a lower surface of the panel 110.

Here, a configuration in which the input operation device 100 includes three symbols A, B, and C will be described, but the number of symbols may be any number as long as there are a plurality of them. A configuration in which the number of symbols is equal to the number of electrostatic electrodes of the electrostatic detection sensor 140 will be described, but the number need not necessarily be the same as long as it is less than the number of electrostatic electrodes. For example, only the symbols A and C may be included without including the symbol B. It is sufficient as long as the electrostatic electrodes are provided on the side opposite to the operation surface 110A of the panel 110 at least in the area where the symbols are arranged.

As illustrated in FIG. 1A, the operation member 120 projects from the opening 111 of the panel 110 toward the operation surface 110A of the panel 110. The operation member 120 is an operation part which is long in the X direction and can be pushed in a downward direction. The operation member 120 can be pushed at any position in the X direction, and pushing at any position similarly moves the operation member 120 downward. An upper end of a movable portion 132 of the push switch 130 contacts the lower end of the operation member 120.

The operation member 120 is an operation part which has three positions in the X direction, namely, a −X direction side, a central portion, and a +X direction side, as the press positions 121 to 123 at which pushing is performed. Symbols D, E, and F are provided in the press positions 121 to 123, as an example. The press positions 121 to 123 are arranged in one row at equal intervals in the X direction, and the positions in the X direction are equal to those of symbols A, B, and C, respectively. The press positions 121 to 123 are located at one end (−X direction side), the center, and the other end (+X direction side) of the operation member 120.

Here, a configuration in which the operation member 120 has three press positions 121 to 123 will be described, but any number of press positions may be provided as long as there are a plurality of them. Further, a description will be given of a configuration in which the number of press positions is equal to the number of electrostatic electrodes 141 to 143 arranged corresponding to the symbols A, B, and C, but the number of the press positions may not be the same as long as the number of the press positions is less than the number of electrostatic electrodes. For example, only the press positions 121 and 123 may be included without including a press position 122. For each of the plurality of press positions, the position in the X direction of the press position is equal to the position in the X direction of a corresponding electrostatic electrode of the plurality of electrostatic electrodes.

The operation contents accepted by the input operation device 100 vary depending on which of the press positions 121 to 123 of the operation member 120 is pushed. Accordingly, the symbols D, E, and F need not necessarily be provided at the press positions 121 to 123.

The symbols D, E, and F are visible from a side of the upper surface of the panel 110 as illustrated in FIG. 1A. Like the symbols A, B, and C, the symbols D, E, and F are, for example, characters or signs representing the types of devices operable by the input operation device 100, the operation contents, and the like. The symbols D, E, and F may be formed on the operation member 120 by printing, embossing, or the like and may and may not light up. When the symbols A, B, and C are examples of first symbols, the symbols D, E, and F can be regarded as examples of second symbols.

As illustrated in FIG. 1B, the upper end of the operation member 120 is projected by a height h1 from the operation surface 110A of the panel 110 when the operation member 120 is not pressed downward. The height h1 is, for example, 0.5 mm to 2 mm. The operation member 120 is pushed down as illustrated in FIG. 1D by being pushed with a fingertip FT. Even when the operation member 120 is pushed down as illustrated in FIG. 1D, the upper end of the operation member 120 is projected by a height h2 from the operation surface 110A. The height h2 is, for example, 0.3 mm to 0.5 mm. The reason for such a configuration will be described in the following.

The push switch 130 includes a base 131 and a movable portion 132. The push switch 130 is positioned below the operation member 120 and, as one example, is positioned below the press position 122 in the X direction. However, with the push switch 130 being positioned below the operation member 120, the position in the X direction may be between the end of the operation member 120 in the −X direction and the end in the +X direction as desired.

The movable portion 132 is movable downward with respect to the base 131. When the movable portion 132 is not moved downward, the two contacts inside the base 131 are separated, and the push switch 130 is turned off. When the movable portion 132 is moved downward, the two contacts inside the base 131 are brought into conduction, and the push switch 130 is turned on. When the movable portion 132 is pushed downward, the push switch 130 is turned on from off, and when the movable portion 132 is released from being pushed downward, the movable portion 132 returns to an upward position, and the push switch is turned off from on.

Since the movable portion 132 of the push switch 130 contacts the lower end of the operation member 120, when the operation member 120 is pushed, the push switch 130 is turned on from off. When the operation member 120 is released from being pushed, the push switch 130 is turned off from on. Two contacts of the push switch 130 are connected to the MCU 150.

The electrostatic detection sensor 140 includes the electrostatic electrodes 141 to 143. The electrostatic detection sensor 140 is a self-capacitive electrostatic sensor for detecting the electrostatic capacitance between the electrostatic electrodes 141 to 143 and the fingertip FT. The electrostatic detection sensor 140 detects electrostatic capacitances of the electrostatic electrodes 141 to 143 when a fingertip FT of the operator approaches the electrostatic electrodes 141 to 143. The electrostatic capacitances between the electrostatic electrodes 141 to 143 and the fingertip FT are results of detection of the fingertip FT by the electrostatic detection sensor 140. A state in which the fingertip FT of the operator approaches is a state in which touching, that is an action of a fingertip FT contacting the operation surface 110A of the panel 110 positioned above the electrostatic electrodes 141 to 143, is being performed.

Since the electrostatic electrodes 141 to 143 are provided on the upper surface of the case 101 in the area where the symbols A, B, and C of the panel 110 are arranged in a plan view, the electrostatic electrodes 141 to 143 are provided on the side opposite to the operation surface of the panel 110.

When the symbols A, B, and C are formed on the panel 110 by printing, embossing, or the like and do not light up, a metal electrode can be used as the electrostatic electrodes 141 to 143. When the symbols A, B, and C light up, a transparent electrode such as indium tin oxide (ITO) can be used as the electrostatic electrodes 141 to 143. The electrostatic detection sensor 140 is connected to the MCU 150 and outputs data representing electrostatic capacitances of the electrostatic electrodes 141 to 143 to the MCU 150.

As one example, the electrostatic electrodes 141 to 143 are rectangular electrodes that are long in the Y direction in a plan view. Approximately half of each electrode on the +Y direction side overlaps with an area where symbols A, B, and C are arranged in a plan view. This configuration is for detecting which of the symbols A, B, and C is being touched, by the electrostatic electrodes 141 to 143.

Approximately half of the electrostatic electrodes 141 to 143 on the −Y direction side does not overlap an area where symbols A, B, and C are arranged. The ends of the electrostatic electrodes 141 to 143 on the −Y direction side are located near the operation member 120. Each end on the −Y direction side of the electrostatic electrodes 141 to 143 is located near the three press positions 121 to 123 of the operation member 120. The press position closest to the electrostatic electrode 141 is the press position 121, the press position closest to the electrostatic electrode 142 is the press position 122, and the press position closest to the electrostatic electrode 143 is the press position 123.

When the ends on the −Y direction side of the electrostatic electrodes 141 to 143 are located near the three press positions 121 to 123 of the operation member 120, it means that the ends on the −Y direction side of the electrostatic electrodes 141 to 143 are so close to the operation member 120 that the electrostatic capacitances between the fingertip FT and the electrostatic electrodes 141 to 143 can be detected when the fingertip FT is in contact with the three press positions 121 to 123 of the operation member 120.

Therefore, when the fingertip FT touches any of the press positions 121 to 123 of the operation member 120, the electrostatic capacitance can be detected in one of the electrostatic electrodes 141 to 143. The reason why the ends of the electrostatic electrodes 141 to 143 in the −Y direction are positioned near the three press positions 121 to 123 of the operation member 120 is to detect which of the three press positions 121 to 123 is being pushed relative to the operation member 120.

The input operation device 100 detects which of the symbols A, B, and C has been touched by using the electrostatic electrodes 141 to 143 in order to allow distinction among touching to the symbols A, B, and C with a simple configuration. When the symbols A, B, and C are touched, the push switch 130 remains to be in the off state because the operation member 120 has not been pushed.

The input operation device 100 detects, in order to allow distinction among pushing against the press positions 121 to 123 on the operation member 120 with a simple configuration, whether or not pushing against the operation member 120 has been performed with the push switch 130. Also, the input operation device 100 determines which of the press positions 121 to 123 has been pushed with the electrostatic electrodes 141 to 143.

In the input operation device 100, the upper end of the operation member 120 is projected from the operation surface 110A in order to make it possible to distinguish among touching to the symbols A, B, and C and pushing to the operation member 120 based on the electrostatic capacitance. When touching the symbols A, B, and C, the fingertip FT touches the operation surface 110A as illustrated in FIG. 1C. On the other hand, when pushing is to be performed, the fingertip FT is positioned on the upper surface of the operation member 120 projecting upward of the operation surface 110A by a height h1 as illustrated in FIG. 1B, and then the operation member 120 is pressed downward by pushing. Even when the operation member 120 is completely pressed, the fingertip FT is positioned upward from the operation surface 110A by a height h2 as illustrated in FIG. 1D. This is because the operation member 120 is configured so that its upper end is projected upward of the operation surface 110A even when pushing is performed. When the operation member 120 is pushed, an area where the fingertip FT and the electrostatic electrodes 141 to 143 overlap in a plan view is smaller than when the symbols A, B, and C are touched.

Therefore, when the operation member 120 is pushed, the electrostatic capacitances detected by the electrostatic electrodes 141 to 143 are smaller than when touching is performed. Touching on the symbols A, B, and C and pushing to the press positions 121 to 123 can be distinguished based on differences in the electrostatic capacitances.

The MCU 150 is provided by a computer including a central processing unit (CPU), a random access memory (RAM), a read only memory (ROM), an input and output interface, an internal bus, and the like.

The MCU 150 includes a determiner 151. The determiner 151 represents a function (functions) of a program executed by the MCU 150 as a functional block. The MCU 150 is connected to a device that uses the input operation device 100 as an operation part, and transmits data representing a determination result of the determiner 151.

The determiner 151 sets a threshold value TH1 and a threshold value TH2 greater than the threshold value TH1 therein. The determiner 151 determines which of the symbols A, B, and C, or the press positions 121 to 123 of the operation member 120 the operator has been operated, based on the on or off state of the push switch 130 and a result of the fingertip FT detection by the electrostatic detection sensor 140. A specific determination method of the determiner 151 will be described in the following with reference to the flowchart of FIG. 3.

<Difference in Touching and Pushing Electrostatic Capacitances>

Figure 2A:
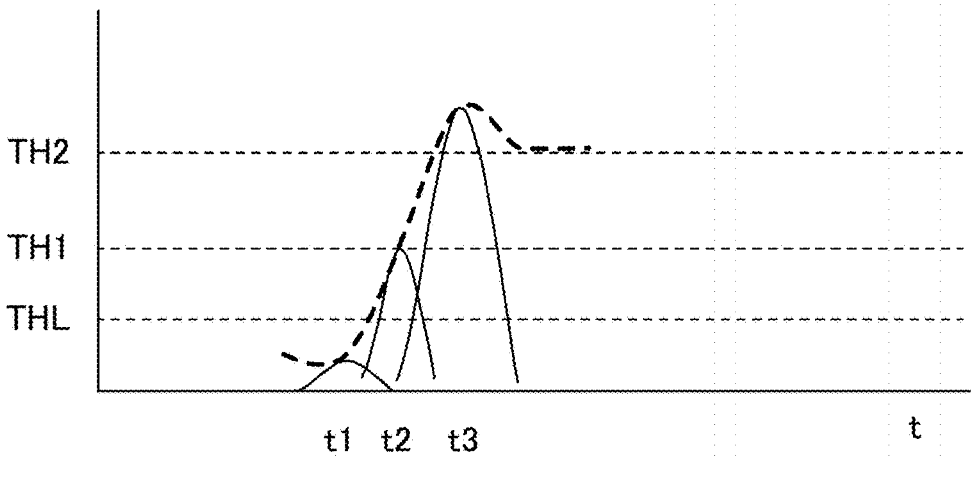
FIG. 2A is a graph illustrating an example of outputs of an electrostatic detection sensor 140 when symbols A to C are touched.
Figure 2B:
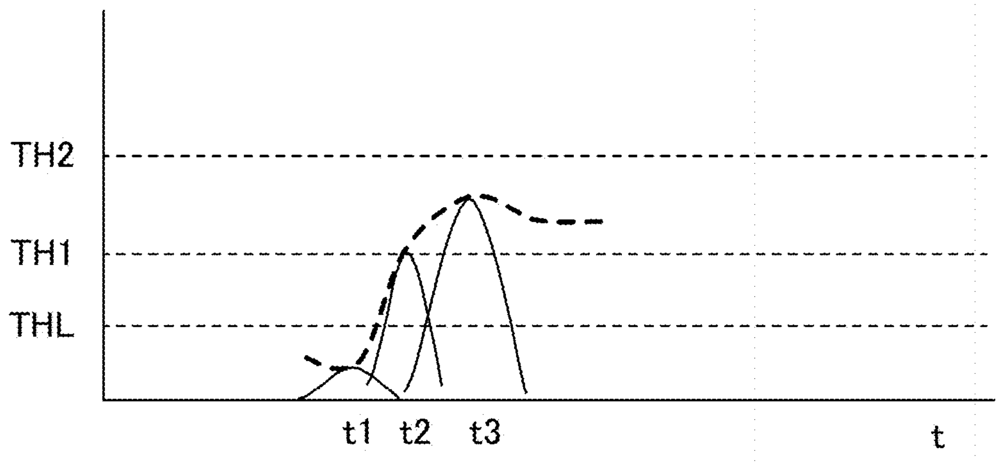
FIG. 2B is a graph illustrating an example of outputs of the electrostatic detection sensor 140 when an operation member 120 is pushed.

FIG. 2A is a graph illustrating an example of outputs by the electrostatic detection sensor 140 when the symbols A to C are touched, with respect to the corresponding electrostatic electrode. FIG. 2B is a graph illustrating an example of outputs by the electrostatic detection sensor 140 when the operation member 120 is pushed, for an electrostatic electrode disposed in the vicinity. In FIGS. 2A and 2B, the horizontal axis represents time t, and the vertical axis represents an electrostatic capacitance. A threshold value THL represents a detectable lower limit of the electrostatic capacitance between the electrostatic electrodes 141 to 143 and the fingertip FT. In FIGS. 2A and 2B, as one example of an approach of the fingertip FT relative to the passage of time, the maximum values of the outputs by the electrostatic detection sensor 140 at times t1, t2, and t3 are illustrated by solid lines, and changes in the maximum values of the outputs obtained at the times are illustrated by broken lines. Note that, for convenience, the maximum values of the outputs at times t1, t2, and t3 are illustrated by the peaks of the solid lines.

The threshold value TH1 is a threshold value for determining whether or not the operation member 120 has been pushed, and is an example of a first threshold value. The threshold value TH1 is greater than the threshold value THL. The threshold value TH2 is greater than the threshold value TH1, and is an example of a second threshold value. The threshold value TH2 is a threshold value for determining whether or not the symbols A, B, and C are touched. The threshold value TH2 is set to such a value that the electrostatic capacitances between the electrostatic electrodes 141 to 143 and the fingertip FT do not exceed even when the operation member 120 is pushed, but that is exceeded by the electrostatic capacitances between the electrostatic electrodes 141 to 143 and the fingertip FT when the symbols A, B, and C are touched.

Therefore, when any one of the symbols A, B, or C is touched, as illustrated in FIG. 2A, at least in one of the corresponding electrostatic electrodes 141 to 143, the electrostatic capacitances detected at the times t1, t2, and t3 gradually increase, and exceed the threshold value TH2 at the time t3 (the state illustrated in FIG. 1C). When any of the press positions 121, 122, or 123 of the operation member 120 is pushed, the electrostatic capacitances detected at times t1, t2, and t3 gradually increase as illustrated in FIG. 2B, at least in one of the electrostatic electrodes 141 to 143 arranged nearby. However, at time t3 (the state illustrated in FIG. 1D), although the electrostatic capacitances are greater than the threshold value TH1, they are less than the threshold value TH2. Accordingly, by using the threshold values TH1 and TH2, it is possible to distinguish among touching on any of the symbols A, B, or C and pushing of any of the press positions 121, 122, and 123 on the operation member 120.

<Flowchart>

Figure 3:
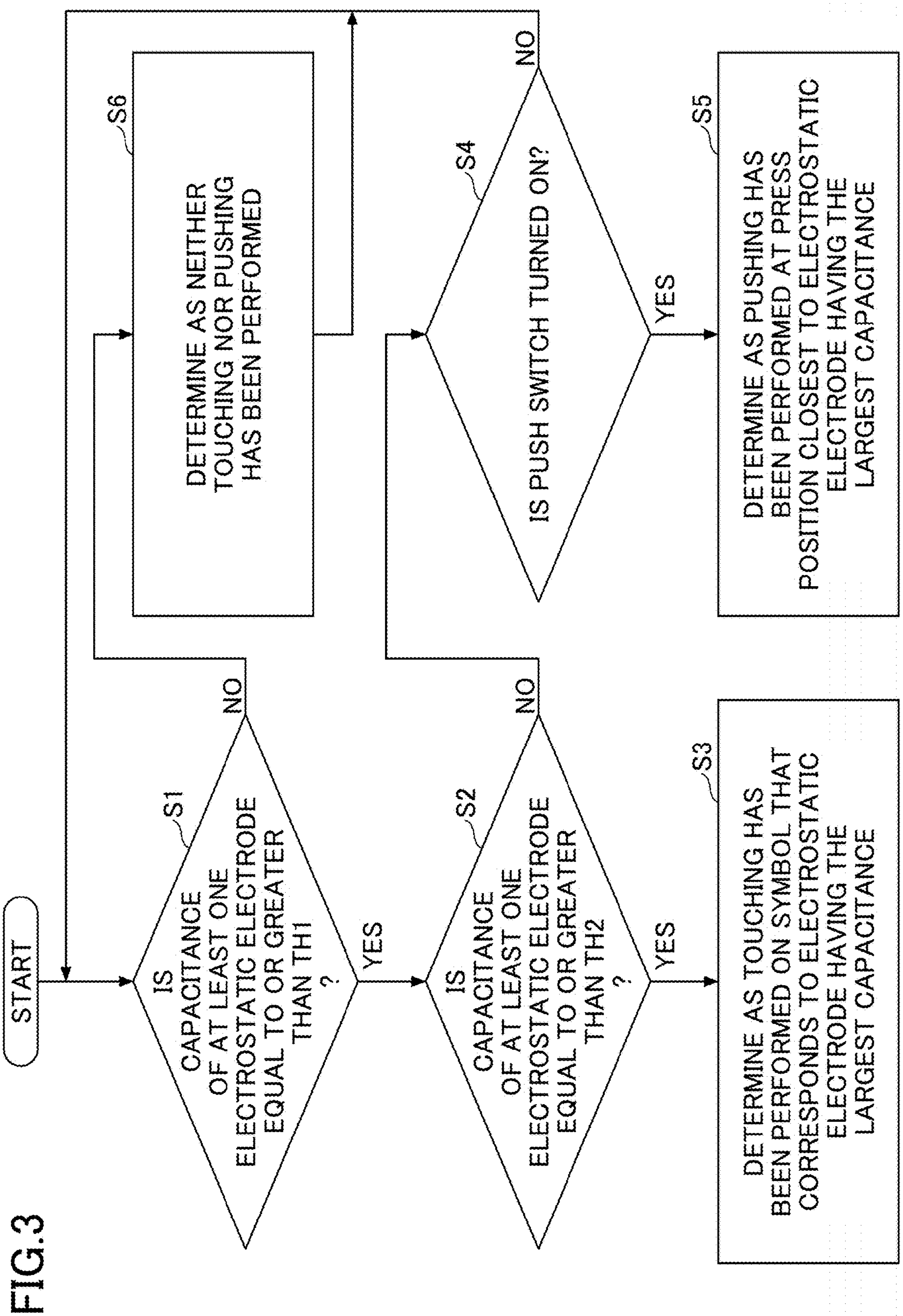
FIG. 3 is a flowchart illustrating processing executed by a determiner 151.

FIG. 3 is a flowchart illustrating the processing executed by the determiner 151.

Upon starting the processing, the determiner 151 determines whether or not the electrostatic capacitance of at least one of the electrostatic electrodes 141 to 143 is equal to or greater than the threshold value TH1 (step S1).

When the determiner 151 determines that the electrostatic capacitance of at least one of the electrostatic electrodes 141 to 143 is equal to or greater than the threshold value TH1 (S1: YES), the determiner 151 determines whether or not the electrostatic capacitance of at least one of the electrostatic electrodes 141 to 143 is equal to or greater than the threshold value TH2 (step S2).

When the determiner 151 determines that the electrostatic capacitance of at least one of the electrostatic electrodes 141 to 143 is equal to or greater than the threshold value TH2 (S2: YES), the determiner 151 determines that the symbol (any one of A to C) corresponding to the electrostatic electrode (any one of 141 to 143) having the largest electrostatic capacitance (step S3) has been touched. When the determiner 151 completes the processing of step S3, the flow returns to step S1.

When the determiner 151 determines that the electrostatic capacitance of at least one of the electrostatic electrodes 141 to 143 is not equal to or greater than the threshold value TH2 (S2: NO) in step S2, the determiner 151 determines whether or not the push switch 130 is turned on (step S4). This is to determine whether or not pushing has been performed on the operation member 120.

When the determiner 151 determines that the push switch 130 is on (S4: YES), the determiner 151 determines that pushing has been performed at the press position (any one of 121 to 123) closest to the electrostatic electrode (any one of 141 to 143) having the largest electrostatic capacitance (step S5). When the determiner 151 completes the processing of step S5, the flow returns to step S1.

When the determiner 151 determines in step S4 that the push switch 130 is not turned on (S4: NO), the flow returns to step S1. This is because pushing has not been performed. A case in which determination made in step S4 of the flow is NO is when, for example, the fingertip FT or a hand approaches one of the electrostatic electrodes 141 to 143, but does not perform touching or pushing thereto.

When the determiner 151 determines that, in step S1, the electrostatic capacitance of at least one of the electrostatic electrodes 141 to 143 is not equal to or greater than the threshold value TH1 (S1: NO), the determiner 151 determines that neither touching nor pushing has been performed (step S6). When the determiner 151 completes the processing of step S6, the flow returns to step S1. This completes a sequence of the processing.

As described above, the input operation device 100 includes: an operation member 120 configured to be pushed by an operator at a plurality of press positions 121 to 123 of the operation member; a push switch 130 configured to be in an on state from an off state by pushing; a panel 110 which includes an operation surface 110A that is configured to be touched by the operator and on which a plurality of symbols A to C are arranged; an electrostatic detection sensor 140 which includes a plurality of electrostatic electrodes 141 to 143 provided on a side opposite to the operation surface 110A of the panel 110 in an area on the panel where the symbols A to C of the panel 110 are arranged in a plan view, the electrostatic detection sensor 140 being configured to detect the electrostatic capacitance of each electrostatic electrode upon approach of a finger of the operator; and a determiner 151 configured to determine which of the operation member 120 and the symbols has been operated by the operator in accordance with the on or off state of the push switch 130 and a detection result of a finger by the electrostatic detection sensor 140. The input operation device 100 uses the electrostatic electrodes 141 to 143 for both touching and pushing while minimizing the number of mechanical components (one operation member 120 and one push switch 130), so that touching on the symbols A to C and pushing on the press positions 121 to 123 can be distinguished.

Accordingly, the input operation device 100 which is compact and can distinguish among a plurality of operations is provided.

Further, since each of the plurality of electrostatic electrodes 141 to 143 is arranged in the vicinity of the corresponding press position among the plurality of press positions 121 to 123 of the operation member 120, it is possible to detect which of the press positions 121 to 123 is the position pushed by the finger, and it is possible to distinguish among pushing on the press positions 121 to 123 with fewer components.

Further, the determiner 151 sets a threshold value TH1 and a threshold value TH2 greater than the threshold value TH1 for the electrostatic capacitance detected by the electrostatic detection sensor 140. The determiner 151 determines that the operation member 120 has been pushed by the operator upon the electrostatic capacitance detected by the electrostatic detection sensor 140 being equal to or greater than the threshold value TH1 but less than the threshold value TH2 in conjunction with the push switch 130 being in the on state. Therefore, it is possible to distinguish between touching and pushing based on the electrostatic capacitance detected by the electrostatic detection sensor 140. Also, it is possible to accurately determine that pushing has been performed by setting a state that the push switch 130 is on as a condition.

Since the determiner 151 determines that the symbol has been touched by the operator when the electrostatic capacitance detected by the electrostatic detection sensor 140 is equal to or greater than the second threshold value TH2, it is possible to accurately determine that touching is being performed based on the electrostatic capacitance detected by the electrostatic detection sensor 140.

Further, with the push switch 130 being in the on state, the determiner 151 determines that pushing has been performed at one of the press positions 121 to 123 that is closest to one of the electrostatic electrodes 141 to 143 among the plurality of electrostatic electrodes 141 to 143, the electrostatic electrode having the largest electrostatic capacitance that is detected in conjunction with having the electrostatic capacitance that is equal to or greater than the first threshold value TH1 and less than the second threshold value TH2. Therefore, it is possible to determine to which of the press positions 121 to 123 pushing is being performed by using the detection result for the electrostatic electrodes 141 to 143, and the input operation device 100 can have fewer components.

Further, since the operation member 120 is projected from the operation surface 110A of the panel 110, a distance in the Z direction between the fingertip FT and the electrostatic electrodes 141 to 143 during touching and the distance in the Z direction between the fingertip FT and the electrostatic electrodes 141 to 143 during pushing are different, so that touching and pushing can be distinguished based on the electrostatic capacitances thereof, and the detection accuracy can be improved.

Also, since the plurality of press positions 121 to 123 of the operation member 120 are located at least at one end, the other end, and the center of the operation member 120, three or more types of pushing can be distinguished.

First Modified Example to Third Modified Example

Figure 4A:
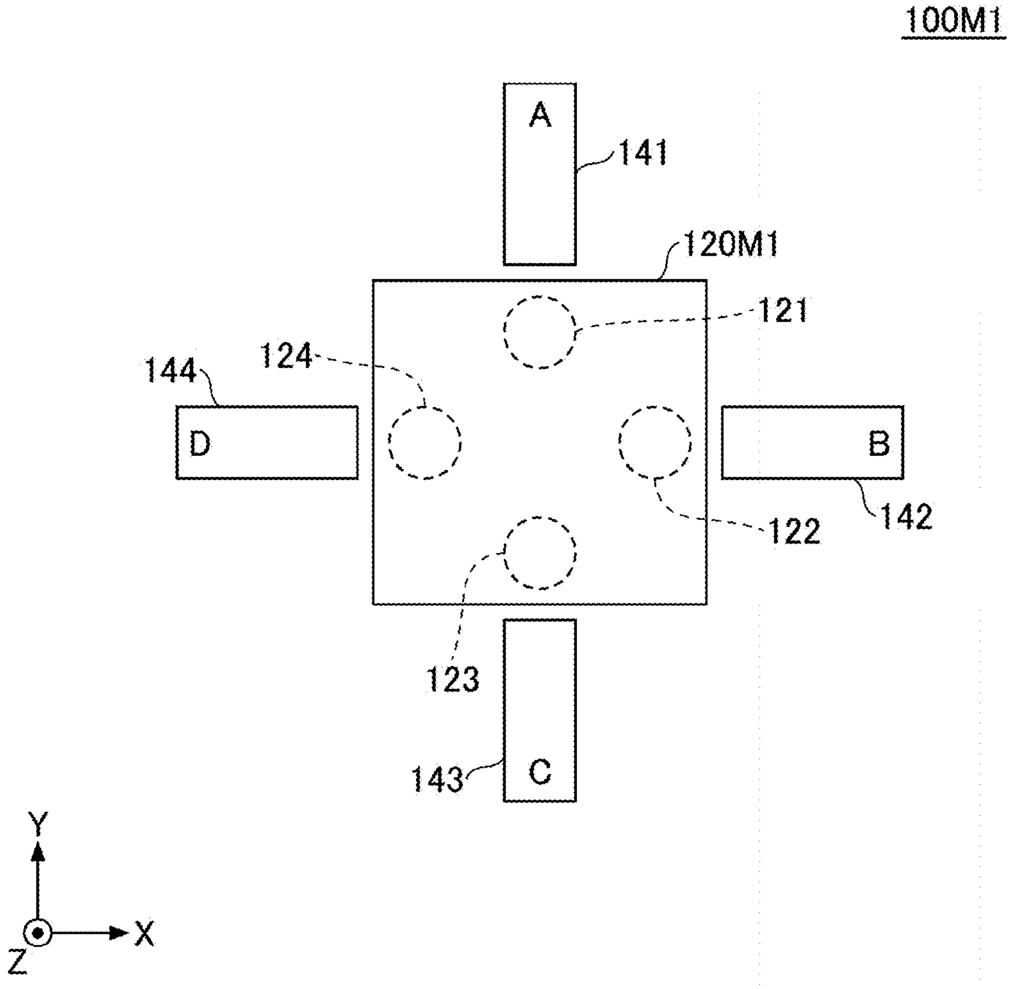
FIG. 4A is a diagram illustrating an arrangement of a plurality of symbols, an operation member 120M1, and a plurality of electrostatic electrodes of the electrostatic detection sensor 140 in an input operation device 100M1 of a first modified example of the embodiment.
Figure 4B:
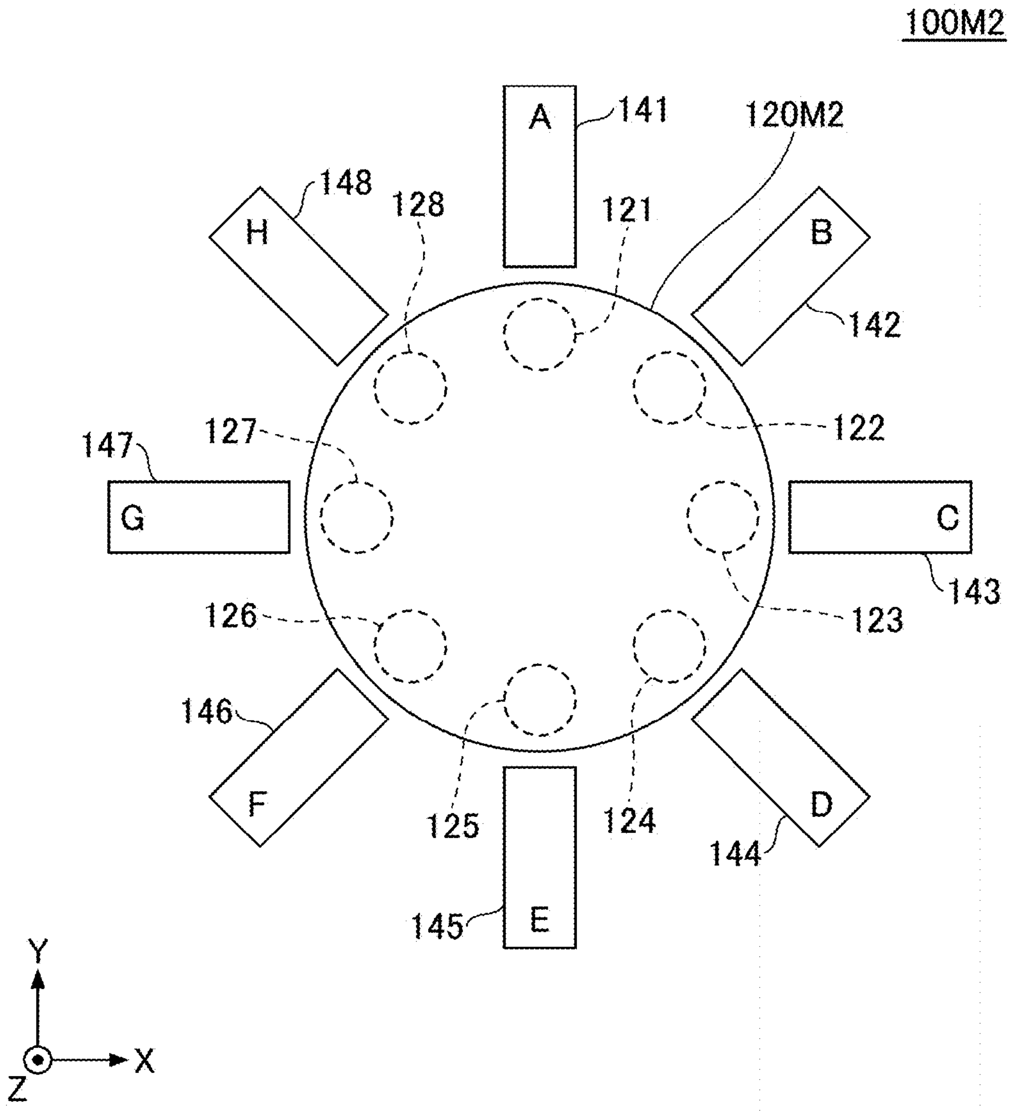
FIG. 4B is a diagram illustrating an arrangement of the plurality of symbols, an operation member 120M2, and the plurality of electrostatic electrodes of the electrostatic detection sensor 140 in an input operation device 100M2 of a second modified example of the embodiment.
Figure 4C:
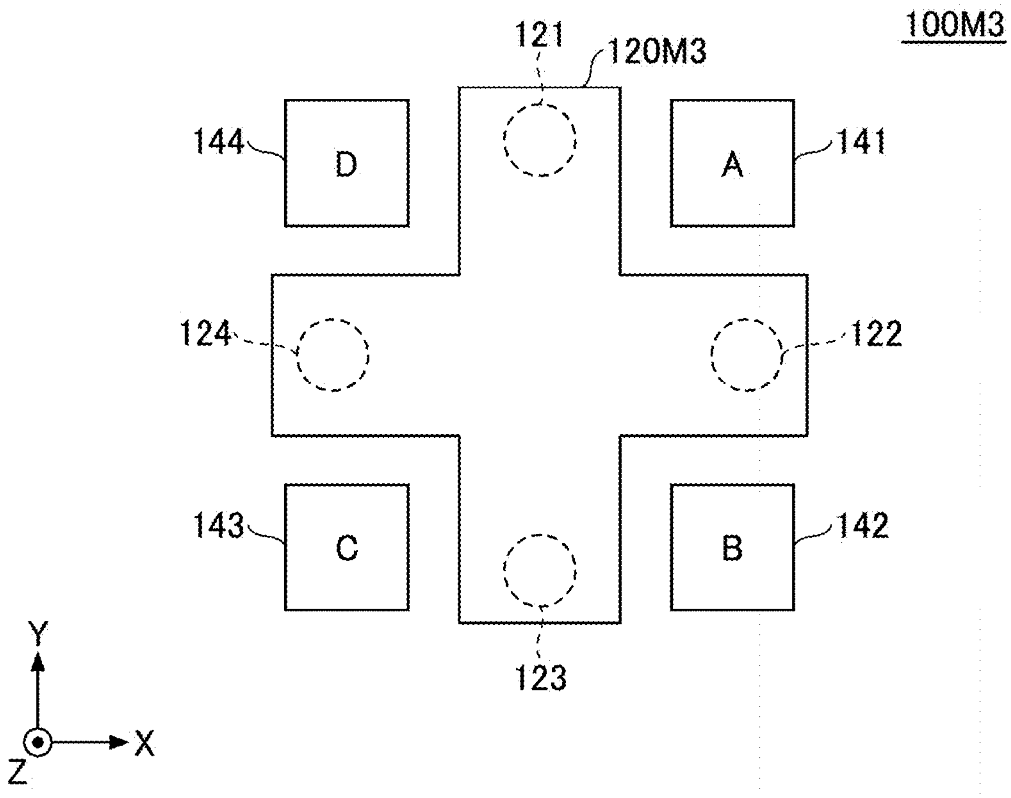
FIG. 4C is a diagram illustrating an arrangement of the plurality of symbols, an operation member 120M3, and the plurality of electrostatic electrodes of the electrostatic detection sensor 140 in an input operation device 100M3 of a third modified example of the embodiment.

Referring now to FIGS. 4A to 4C, modified examples of the arrangement of the plurality of symbols on the operation surface 110A, operation members 120M1 to 120M3, and the plurality of electrostatic electrodes of the electrostatic detection sensor 140 will be described. FIGS. 4A to 4C are diagrams illustrating arrangements of the plurality of symbols, the operation members 120M1 to 120M3, and the plurality of electrostatic electrodes of the electrostatic detection sensor 140 in the input operation devices 100M1 to 100M3 according to the first modified example to the third modified example of the embodiment.

<Input Operation Device 100M1>

As illustrated in FIG. 4A, press positions 121 to 124 are provided at the centers of the four sides of the square operation member 120M1 in a plan view. Although a push switch 130 is not illustrated in FIG. 4A, it may be provided below the center of the operation member 120M1, for example.

The electrostatic electrodes 141 to 144 are provided at positions corresponding to the press positions 121 to 124, and extend vertically outward from the centers of the four sides of the operation member 120M1. A longitudinal direction of the electrostatic electrodes 141 to 144 is a direction perpendicular to the four sides of the operation member 120M1 in a plan view. The ends of the electrostatic electrodes 141 to 144 toward the operation member 120M1 in the longitudinal direction are provided in the vicinity of the operation member 120M1. The symbols A to D are provided on a side away from the press positions 121 to 124 in the longitudinal direction of the electrostatic electrodes 141 to 144.

In such a device as the input operation device 100M1, when any one of the electrostatic capacitances detected by the electrostatic electrodes 141 to 144 is equal to or greater than the second threshold value TH2, it can be determined that the corresponding one of the symbols A to D has been touched.

Further, when the push switch 130 is in the on state, it can be determined that pushing has been performed at a press position (any one of 121 to 124) closest to the electrostatic electrode (any one of 141 to 144) having the largest electrostatic capacitance among the electrostatic electrodes 141 to 144 having electrostatic capacitances that are equal to or greater than the first threshold value TH1 and less than the second threshold value TH2. Incidentally, the operation member 120M1 may be rectangular in a plan view, and the press positions 121 to 124 may be diamond-shaped and positioned at four vertices.

<Input Operation Device 100M2>

In the input operation device 100M2 illustrated in FIG. 4B, the press positions 121 to 128 are provided at 45° intervals along the circumference of the circular operation member 120M2 in a plan view. Although the push switch 130 is not illustrated in FIG. 4B, it may be provided below the center of the operation member 120M2, for example.

The electrostatic electrodes 141 to 148 are provided at positions corresponding to the press positions 121 to 128 and extend radially outward of the operation member 120M2. The longitudinal direction of the electrostatic electrodes 141 to 148 is along the radial direction of the operation member 120M2. The ends of the electrostatic electrodes 141 to 148 toward the operation member 120M2 in the longitudinal direction are provided in the vicinity of the operation member 120M2. The symbols A to H are provided away from the press positions 121 to 128 in the longitudinal direction of the electrostatic electrodes 141 to 148.

In such a device as the input operation device 100M2, when any one of the electrostatic capacitances detected by the electrostatic electrodes 141 to 148 is equal to or greater than the second threshold value TH2, it can be determined that the corresponding one of the symbols A to H has been touched.

Further, when the push switch 130 is in the on state, it can be determined that pushing has been performed at the press position (any one of 121 to 128) closest to the electrostatic electrode (any one of 141 to 148) having the largest electrostatic capacitance among the electrostatic electrodes 141 to 148 having electrostatic capacitances that are equal to or greater than the first threshold value TH1 and less than the second threshold value TH2. Incidentally, the number of the electrostatic electrodes may be any number as long as there are a plurality of them, and the number of the press positions may be any number as long as there are a plurality of them. The number of press positions may be less than the number of electrostatic electrodes.

<Input Operation Device 100M3>

As illustrated in FIG. 4C, the input operation device 100M3 includes an operation member 120M3 having a cross shape in a plan view. The press positions 121 to 124 are provided at four ends of the operation member 120M3 having a cross-shape. Although the push switch 130 is not illustrated in FIG. 4C, it may be provided below the center of the operation member 120M3, for example. The electrostatic electrodes 141 to 144 are square in a plan view and are arranged to sandwich the press positions 121 to 124 of the operation member 120M3 having a cross shape. The symbols A to D are provided at the centers of the electrostatic electrodes 141 to 144. Since the electrostatic electrodes 141 to 144 are about half the size in the longitudinal direction of the electrostatic electrodes 141 to 144 illustrated in FIG. 4A, the symbols A to D are provided substantially in an entire area overlapping with the areas of the electrostatic electrodes 141 to 144.

In such a device as the input operation device 100M3, when any one of the electrostatic capacitances detected by the electrostatic electrodes 141 to 144 is equal to or greater than the second threshold value TH2, it can be determined that the corresponding one of the symbols A to D has been touched.

Further, when the push switch 130 is in the on state, it can be determined that pushing has been performed at a press position (any one of 121 to 124) that is closest to two electrostatic electrodes (two adjacent ones among 141 to 144) having the largest electrostatic capacitance and the second largest electrostatic capacitance among the electrostatic electrodes 141 to 144 and having electrostatic capacitances that are equal to or greater than the first threshold value TH1 and less than the second threshold value TH2. For example, when the push switch 130 is in the on state, it can be determined that pushing has been performed at the press position 121 closest to the electrostatic electrodes 141 and 144, when the electrostatic capacitances of the electrodes 141 and 144 are equal to or greater than the first threshold value TH1 and less than the second threshold value TH2, and when the electrostatic capacitance of the electrostatic electrode 141 is the largest and the electrostatic capacitance of the electrostatic electrode 144 is the second largest. In such a case, the press position (one of 121 to 124) closest to the two electrostatic electrodes (two adjacent ones among 141 to 144) is the press position located between the two electrostatic electrodes (two adjacent ones among 141 to 144).

According to the first modified example to the third modified example, the input operation devices 100M1 to 100M3 that are compact and capable of distinguishing among a plurality of operations can be provided. The arrangement of the operation member and the plurality of electrostatic electrodes may be other than those illustrated in the first modified example to the third modified example, and similarly, touching and pushing can be detected.

When the push switch 130 is in the on state, it may be determined that pushing has been performed at the press position closest to three electrostatic electrodes, those having the largest electrostatic capacitance, the second largest electrostatic capacitance, and the third largest electrostatic capacitance among a plurality of electrostatic electrodes, in which the electrostatic capacitances thereof are equal to or greater than the first threshold value TH1 and less than the second threshold value TH2. Such a determination method includes, when the push switch 130 is in the on state, determining that pushing has been performed at the press position closest to two electrostatic electrodes, those having the largest electrostatic capacitance and the second largest electrostatic capacitance among the plurality of electrostatic electrodes, in which the electrostatic capacitances thereof are equal to and greater than the first threshold value TH1 and less than the second threshold value TH2.

An input operation device that is compact and capable of distinguishing among a plurality of operations is provided.

Although the input operation device of the exemplary embodiment of the present disclosure has been described above, the present disclosure is not limited to the embodiment specifically disclosed, and variations and modifications thereof are possible without departing from the scope of the claims.

The present international application is based on and claims priority to Japanese Patent Application No. 2022-

039279 filed on Mar. 14, 2022, the entire contents of which are hereby incorporated by reference.

What is claimed is:

1. An input operation device, comprising:

an operation member configured to be pushed by an operator at a plurality of press positions of the operation member;

a push switch configured to be in an on state from an off state by pushing;

a panel that includes an operation surface that is configured to be touched by the operator and on which a plurality of symbols are arranged;

an electrostatic detection sensor that includes a plurality of electrostatic electrodes provided on a surface of the panel opposite to the operation surface of the panel in an area on the panel in which the symbols are arranged in a plan view, the electrostatic detection sensor being configured to detect an electrostatic capacitance upon approach of a finger of the operator for each of the electrostatic electrodes; and a determiner configured to determine which of the operation member and the symbols has been operated by the operator in accordance with the on or off state of the push switch and a detection result of the finger by the electrostatic detection sensor, wherein the determiner sets a first threshold value and a second threshold value greater than the first threshold value for the electrostatic capacitance detected by the electrostatic detection sensor, and the determiner determines that the operation member has been pushed by the operator upon the electrostatic capacitance detected by the electrostatic detection sensor being equal to or greater than the first threshold value and less than the second threshold value in conjunction with the push switch being in the on state.

2. The input operation device according to claim 1, wherein each of the plurality of the electrostatic electrodes is arranged in a vicinity of a corresponding press position among the plurality of press positions of the operation member.

3. The input operation device according to claim 1, wherein the determiner determines that one of the symbols has been touched by the operator upon the electrostatic capacitance detected by the electrostatic detection sensor being equal to or greater than the second threshold value.

4. The input operation device according to claim 1, wherein with the push switch being in the on state, the determiner determines that the pushing has been performed at the press position that is closest to an electrostatic electrode among the plurality of electrostatic electrodes, the electrostatic electrode having a largest electrostatic capacitance that is detected in conjunction with having the electrostatic capacitance that is equal to or greater than the first threshold value and less than the second threshold value.

5. The input operation device according to claim 1, wherein with the push switch being in the on state, the determiner determines that the pushing has been performed at the press position that is closest to two electrostatic electrodes among the plurality of electrostatic electrodes, the two electrostatic electrodes having a largest electrostatic capacitance and a second largest electrostatic capacitance in conjunction with each having the electrostatic capacitance that is equal to or greater than the first threshold value and less than the second threshold value.

6. The input operation device according to claim 1, wherein the operation member is projected from the operation surface of the panel.

7. The input operation device according to claim 1, wherein the plurality of the press positions of the operation member are located at least at one end, another end, and a center of the operation member.

* * * * *